United States Patent
Ito et al.

(10) Patent No.: US 10,633,568 B2
(45) Date of Patent: Apr. 28, 2020

(54) URETHANE ADHESIVE FOR LAMINATED SHEETS

(71) Applicant: Henkel AG & Co. KGaA, Duesseldorf (DE)

(72) Inventors: Shoko Ito, Osaka (JP); Noriyoshi Kamai, Osaka (JP); Yasushi Yamada, Osaka (JP); Hitoshi Ikeda, Osaka (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/612,011

(22) Filed: Jun. 2, 2017

(65) Prior Publication Data

US 2017/0267902 A1  Sep. 21, 2017

Related U.S. Application Data

(63) Continuation of application No. PCT/JP2015/005864, filed on Nov. 26, 2015.

(30) Foreign Application Priority Data

Dec. 5, 2014  (JP) ................. 2014-246658

(51) Int. Cl.
| | |
|---|---|
| *B32B 7/12* | (2006.01) |
| *C09J 175/04* | (2006.01) |
| *C08K 5/09* | (2006.01) |
| *C08G 18/30* | (2006.01) |
| *C08G 18/65* | (2006.01) |
| *C08G 18/62* | (2006.01) |
| *C08G 18/79* | (2006.01) |
| *C08G 18/76* | (2006.01) |
| *C08G 18/28* | (2006.01) |
| *C08G 18/34* | (2006.01) |
| *C08G 18/67* | (2006.01) |

(52) U.S. Cl.
CPC .............. *C09J 175/04* (2013.01); *B32B 7/12* (2013.01); *C08G 18/281* (2013.01); *C08G 18/30* (2013.01); *C08G 18/341* (2013.01); *C08G 18/6241* (2013.01); *C08G 18/6262* (2013.01); *C08G 18/65* (2013.01); *C08G 18/6541* (2013.01); *C08G 18/6755* (2013.01); *C08G 18/7642* (2013.01); *C08G 18/792* (2013.01); *B32B 2375/00* (2013.01)

(58) Field of Classification Search
None
See application file for complete search history.

(56) References Cited

U.S. PATENT DOCUMENTS

| | | | | |
|---|---|---|---|---|
| 5,478,897 | A * | 12/1995 | Sasano ................... | C08G 18/10 525/453 |
| 5,859,122 | A * | 1/1999 | Umeya ................... | C08G 18/12 524/591 |
| 6,423,810 | B1 * | 7/2002 | Huang ................... | C08G 18/10 525/131 |
| 2007/0179254 | A1* | 8/2007 | Wang ................. | C08G 18/3206 525/440.072 |
| 2011/0212267 | A1* | 9/2011 | Van Steenis ......... | C08G 18/089 427/385.5 |
| 2013/0115405 | A1 | 5/2013 | Kinzelmann et al. | |
| 2014/0020758 | A1 | 1/2014 | Ito et al. | |
| 2014/0251432 | A1* | 9/2014 | Ito ...................... | C08G 18/6229 136/259 |
| 2015/0034157 | A1* | 2/2015 | Yamada ................... | B32B 7/12 136/256 |
| 2015/0380695 | A1* | 12/2015 | Hanaki ................. | B32B 15/095 429/176 |

FOREIGN PATENT DOCUMENTS

| | | | |
|---|---|---|---|
| JP | 2010263193 A | | 11/2010 |
| JP | 2011105819 A | | 6/2011 |
| JP | 2012142349 A | | 7/2012 |
| JP | 2012201840 A | | 10/2012 |
| JP | 2012214703 A | | 11/2012 |
| JP | 2016111178 A | * | 6/2016 |
| KR | 20130101781 A | | 9/2013 |
| RU | 2013102886 A | | 7/2014 |
| UA | 42060 C2 | | 10/2001 |
| WO | 2013077457 A2 | | 5/2013 |
| WO | 2014030772 A1 | | 2/2014 |

OTHER PUBLICATIONS

International Search Report for International PCT Patent Application No. PCT/JP2015/005864 dated Feb. 26, 2016.

* cited by examiner

*Primary Examiner* — Sheeba Ahmed
(74) *Attorney, Agent, or Firm* — James E. Piotrowski

(57) ABSTRACT

Disclosed is an adhesive for laminated sheets comprising a urethane resin obtained by blending: (A) an acrylic polyol; (B) at least one component selected from carboxylic acids and carboxylic anhydrides; and (C) an isocyanate compound. The acrylic polyol (A) is obtained by polymerization of a polymerizable monomer, has a glass transition temperature of from −35 ° C. to 20° C., and has a hydroxyl value of from 0.5 to 40 mgKOH/g. The adhesive for laminated sheets is excellent in initial adhesion to a film, peel strength after aging and hydrolysis resistance for a long time under high temperature when a laminated sheet is produced, and wherein the adhesive does not impart an adverse effect to the appearance of the laminated sheet and the lamination process of films while improving the curability. The laminated sheet is suitably prepared using the adhesive for laminated sheets. An article comprising the laminated sheet can be prepared using the laminated sheet.

12 Claims, 1 Drawing Sheet

URETHANE ADHESIVE FOR LAMINATED SHEETS

CROSS-REFERENCE TO RELATED APPLICATION

This application claims priority under Article 4 of the Paris Convention based on Japanese Patent Application No. 2014-246658 filed on Dec. 5, 2014 in Japan. This priority patent application is incorporated herein by reference in its entirety.

The present invention relates to an adhesive for laminated sheets. Moreover, the present invention also relates to a laminated sheet obtainable by using the adhesive, and an article (or a material), for example packaging bags (packaging bags for shampoo, detergents, food staffs and the like) and outdoor materials (solar battery modules and the like), obtainable by using the laminated sheet.

Outdoor materials such as barrier materials, roof materials, solar battery modules (or panels), window materials, outdoor flooring materials, illumination protective materials, automobile members and signboards, and packaging bags and the like include, as a constituent material, a laminated sheet (or laminate) obtainable by laminating plural films using an adhesive. Examples of the film composing the laminated sheet include metal foils made of metals such as aluminum, copper, and steel; metal plates and metal deposited films; and films made of plastics such as polypropylenes, polyvinyl chlorides, polyesters, fluororesins, and acrylic resins.

As shown in FIG. 1, a laminated sheet 10 is a laminate of a plurality of films 11 and 12, and the films 11 and 12 are laminated by interposing an adhesive 13 therebetween. Since the laminate is exposed outdoors over a long term, excellent durability is required of the adhesive for laminated sheets. It is required for adhesives for laminated sheets, particularly adhesives for solar battery applications, which convert sunlight into electricity, to have a higher level of durability than a conventional adhesive for laminated sheets.

As shown in FIG. 3, in the case of solar battery applications, the laminated sheet 10 referred to as a back sheet is included in a solar battery module 1, together with a sealing material 20, a solar battery cell 30, and a glass plate 40.

Since the solar battery module 1 is exposed outdoors over a long term, sufficient durability against sunlight is required under conditions of high temperature and high humidity. Particularly, when the adhesive 13 has poor performance, the film 11 can peel from the film 12, and thus the appearance of the laminated sheet deteriorates. Therefore, it is required that the adhesive for laminated sheets for the production of the solar battery module does not undergo peeling of the film of the laminated sheet even though the adhesive is exposed to high temperature over a long term.
Patent Document 1 JP 5003849 B
Patent Document 2 JP 2012-142349 A Patent Documents 1 to 2 disclose, as examples of adhesives for laminated sheets, urethane based adhesives for producing solar battery protection sheets.

Patent Document 1 discloses an adhesive for laminated sheets which is used for producing solar battery back sheets, which adhesive for laminated sheets comprises an acrylic polyol and an isocyanate compound (refer to [Claim 1] of Patent Document 1). The acrylic polyol is adjusted to have a glass transition temperature in a specific range and to have a hydroxyl value in a specific range, and the isocyanate compound is limited to have a specific structure, so that the adhesive has improved environmental resistances (various durability under various environments, for example adhesive strength before and after aging, heat and humidity resistance and the like) (refer to [Table 1] to [Table 5] of Patent Document 1).

Patent Document 2 also discloses a method for producing a solar battery back sheet by using an adhesive comprising a urethane resin obtainable by a reaction of an acrylic polyol with an isocyanate compound (refer to [Claim 1] and [Claim 5] of Patent Document 2). The adhesive for solar battery back sheets of Patent Document 2 is excellent in initial adhesion to a film, hydrolysis resistance, film peel strength after aging, yellowing by UV radiation (refer to [Table 1] to [Table 5] of Patent Document 2).

Recent years, performance required to the adhesives for solar battery back sheets increases year by year. The adhesive for solar battery back sheets should be excellent in not only durability, but also handling (or handiness) when a solar battery back sheet is produced.

The adhesives of Patent Documents 1 and 2 are excellent in durability, but the curability (or hardenability) of the adhesives does not completely satisfy a high level request of consumers. It is necessary for the adhesive to have more improved curability so as to produce solar battery back sheets efficiently.

One of methods to improve the curability is to add a catalyst to the adhesive. The addition of the catalyst improves the curability, but since the pot life (or working life) may be too short, the short pot life may have some difficulty in a laminating process of films and in appearance of obtainable laminated sheets.

SUMMARY

The present invention has been made so as to solve such a problem and an object thereof is to provide an adhesive for laminated sheets, which is excellent in initial adhesion to a film in producing a laminated sheet (or laminate), in peel strength after aging (or curing), and in hydrolysis resistance over a long term at high temperature, and wherein the adhesive does not impart an adverse effect to the appearance of the laminated sheet and the laminating process of films while improving the curability (or hardenability). Moreover, an object of the present invention is to provide a laminated sheet (such as solar battery backsheets and the like) obtainable by using the adhesive, and an article (or a material) (such as packaging bags and outdoor materials (for example solar battery module) and the like) obtainable by using the laminated sheet.

The present inventors intensively studied, and surprisingly found that use of a specific polyol as a raw material of a urethane resin and further addition of a specific compound lead an adhesive for laminated sheets, which is excellent in initial adhesion to a film in producing a laminated sheet, in peel strength after aging, and in hydrolysis resistance over a long term at high temperature, and wherein the adhesive does not impart an adverse effect to the appearance of the laminated sheet and the laminating process of films while improving the curability. And the present invention has been completed.

Namely, the present invention provides, in an aspect, an adhesive for laminated sheets comprising a urethane resin obtainable by blending: (A) an acrylic polyol; (B) at least one selected from carboxylic acids and carboxylic anhydrides; and (C) an isocyanate compound, wherein the acrylic polyol (A) is obtainable by polymerization of a polymerizable monomer, has a grass transition temperature of from −35° C. to 20° C., and has a hydroxyl value of from 0.5 to 40 mgKOH/g.

An adhesive for laminated sheets, in an embodiment, is provided, wherein the at least one selected from carboxylic acids and carboxylic anhydrides (B) comprises a compound having a melting point not more than 280° C.

An adhesive for laminated sheets, in another embodiment, is provided, wherein the at least one selected from carboxylic acids and carboxylic anhydrides (B) is blended in an amount of 0.01 to 10 parts by weight based on 100 parts by weight of the acrylic polyol (A).

An adhesive for laminated sheets, in a preferable embodiment, is provided, wherein the polymerizable monomer comprises a monomer having a hydroxyl group and the other monomer; and the other monomer comprises acrylonitrile and a (meth)acrylic ester.

An adhesive for laminated sheets, in a preferable embodiment, is provided, wherein the acrylonitrile is comprised in an amount of 1 to 40 parts by weight based on 100 parts by weight of the total of the acrylonitrile and the (meth)acrylic ester.

An adhesive for laminated sheets, in a further preferable embodiment, is provided, wherein the at least one selected from carboxylic acids and carboxylic anhydrides (B) comprises at least one selected from adipic acid, benzoic acid, dimer acid, azelaic acid, and trimelitic anhydride.

An adhesive for laminated sheets, in a further more preferable embodiment, is provided, wherein the at least one selected from carboxylic acids and carboxylic anhydrides (B) is blended in an amount of 0.01 to 8.0 parts by weight based on 100 parts by weight of the total of the acrylic polyol (A); the at least one selected from carboxylic acids and carboxylic anhydrides (B); and the isocyanate compound (C).

An adhesive for laminated sheets, in a further other embodiment, is provided, wherein an equivalent ratio (NCO/OH) of the isocyanate group (NCO) based on the isocyanate to the hydroxyl group (OH) based on the acrylic polyol is 0.5 to 4.5.

The present invention provides, in another aspect, a laminated sheet obtainable by using the adhesive for laminated sheets.

The present invention provides, in a preferred aspect, an article (an outdoor material, a packaging bag and the like) obtainable by using the laminated sheet.

An adhesive for laminated sheets of an aspect of the present invention comprises a urethane resin obtainable by blending: (A) an acrylic polyol; (B) at least one selected from carboxylic acids and carboxylic anhydrides; and (C) an isocyanate compound, wherein the acrylic polyol (A) is obtainable by the polymerization of a polymerizable monomer, has a grass transition temperature of from −35° C. to 20° C., and has a hydroxyl value of from 0.5 to 40 mgKOH/g. The adhesive is excellent in initial adhesion to a film in producing a laminated sheet (or a laminate), in peel strength after aging, and in hydrolysis resistance over a long term at high temperature, and wherein the adhesive does not impart an adverse effect to the appearance of the laminated sheet and the laminating process of films while improving the curability.

Therefore, the laminated sheet can be produced suitably using such an adhesive for laminated sheets, and an article can be produced using the laminated sheet.

DETAILED DESCRIPTION OF EMBODIMENTS

Figure 1:
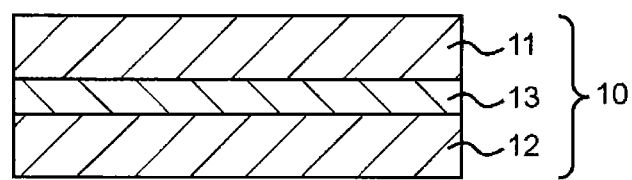
FIG. 1 is a sectional view showing an embodiment of a solar battery backsheet based on the present invention.

An adhesive for laminated sheets based on the present invention comprises a urethane resin obtainable by blending: (A) an acrylic polyol; (B) at least one selected from carboxylic acids and carboxylic anhydrides; and (C) an isocyanate compound.

When the urethane resin is synthesized, the order and method for blending the components (A) to (C) are not limited as long as the objective adhesive for laminated sheets of an embodiment of the present invention is obtainable. For example, the three components: the components (A) to (C) may be blended at one time. Moreover, the component (B) may be blended with the component (A) and then the component (C) may be added. Furthermore, the component (B) may be blended with the component (C) and then the component (A) may be added.

The urethane resin based on the present invention is a polymer obtainable by blending and reacting (A) the acrylic polyol with (C) the isocyanate compound, and has a urethane bond.

(A) The acrylic polyol is obtainable by the addition polymerization of a polymerizable monomer, and the polymerizable monomer includes a "monomer having a hydroxyl group" and the "other monomer."

The "monomer having a hydroxyl group" is a radical polymerizable monomer having a hydroxyl group and an ethylenic double bond, and is not particularly limited as long as the objective adhesive for laminated sheets based on the present invention can be obtained. The monomer having a hydroxyl group includes for example, a hydroxyalkyl (meth)acrylate, and the hydroxyalkyl (meth)acrylate may be used alone, or two or more hydroxyalkyl (meth)acrylates may be used in combination. The hydroxyalkyl (meth)acrylate may also be used in combination with a monomer having a hydroxyl group, except for the hydroxyalkyl (meth)acrylate.

Examples of the "hydroxyalkyl (meth)acrylate" include, but are not limited to, 2-hydroxyethyl (meth)acrylate, 2-hydroxypropyl (meth)acrylate, 3-hydroxypropyl (meth)acrylate, 4-hydroxybutyl (meth)acrylate and the like.

Examples of the "polymerizable monomer having a hydroxyl group, except for the hydroxylalkyl (meth)acrylates" include a polyethylene glycol mono(meth)acrylate, a polypropylene glycol mono(meth)acrylate and the like.

The "other monomer" is a "radical polymerizable monomer having an ethylenic double bond" except for the monomer having a hydroxyl group, and is not particularly limited as long as the objective adhesive for laminated sheets based on the present invention can be obtained. The other monomers preferably comprise acrylonitrile and a (meth)acrylic ester, and may further comprise a radical polymerizable monomer having an ethylenic double bond, except for acrylonitrile and (meth)acrylic esters. The adhesive based on the present invention is preferably excellent in peel strength after aging and may provide a laminated sheet having further improved appearance, when the other monomers comprise acrylonitrile and a (meth)acrylic ester.

The "acrylonitrile" is a compound represented by the general formula: $CH_2=CH-CN$, and is also called acrylic nitrile, acrylic acid nitrile or vinyl cyanide.

The acrylonitrile is preferably contained in an amount of from 1 to 40 parts by weight, more preferably from 5 to 35 parts by weight, and particularly preferably from 5 to 25 parts by weight, based on 100 parts by weight of the polymerizable monomers. When the acrylonitrile is contained in an amount of the above range, a laminated sheet having further improved appearance may be provided, and an adhesive for laminated sheet excellent in balance between peel strength after aging and hydrolysis resistance may be provided.

The "(meth)acrylic ester" is obtainable, for example, by the condensation reaction of (meth)acrylic acid with a monoalcohol, and has an ester bond. Even though it has an ester bond, a monomer having a hydroxyl group is not included in the (meth)acrylic esters. Specific examples thereof include (meth)acrylic acid alkyl esters such as methyl (meth)acrylate, ethyl (meth)acrylate, butyl (meth) acrylate, 2-ethylhexyl (meth)acrylate, cyclohexyl (meth) acrylate, dicyclopentanyl (meth)acrylate, isobornyl (meth) acrylate and the like; glycidyl (meth)acrylate and the like. Both linear alkyl group and cyclic alkyl group are included in this "alkyl group".

The "(meth)acrylic ester" preferably includes at least one selected from methyl (meth)acrylate, ethyl (meth)acrylate, butyl (meth)acrylate, 2-ethylhexyl (meth)acrylate, and cyclohexyl (meth)acrylate, more preferably includes at least one selected from methyl (meth)acrylate, ethyl (meth)acrylate, and butyl (meth)acrylate, and most preferably includes both methyl methacrylate and n-butyl acrylate.

In the present description, acrylic acid and methacrylic acid are collectively referred to as "(meth)acrylic acid", and "an acrylic ester and a methacrylic ester" are collectively referred to as a "(meth)acrylic ester" or a "(meth)acrylate".

Examples of the "radical polymerizable monomer having an ethylenic double bond, except for acrylonitrile and (meth) acrylic esters" include, but are not limited to, (meth)acrylic acid, styrene, vinyl toluene and the like. The radical polymerizable monomer is not limited to these compounds as long as an adhesive for laminated sheets based on the present invention can be obtained.

As long as an objective adhesive for laminated sheets of the present invention can be obtained, there is no particular limitation on the polymerization method of the polymerizable monomer. For example, the polymerizable monomer can be polymerized by the radical polymerization of the polymerizable monomer with a suitable catalyst etc. in an organic solvent using a general solvent polymerization method. Herein, there is no particular limitation on the organic solvent as long as it can be used to polymerize the polymerizable monomer, and it does not substantially exert an adverse influence on the properties of the adhesive after the polymerization reaction. Examples of such solvent include aromatic solvents such as toluene, xylylene and the like; ester based solvents such as ethyl acetate, butyl acetate and the like; and combinations thereof.

The polymerization reaction conditions such as reaction temperature, reaction time, type of organic solvents, type and concentration of monomers, stirring rate, as well as type and concentration of polymerization initiators in the polymerization of the polymerizable monomers can be appropriately selected according to characteristics and the like of the objective adhesive.

The "polymerization initiator" is preferably a compound which can accelerate the polymerization of the polymerizable monomer when added in a small amount and can be used in an organic solvent. Examples of the polymerization initiator include ammonium persulfate, t-butyl peroxybenzoate, 2,2-azobisisobutyronitrile (AIBN), and 2,2-azobis(2, 4-dimethylvarelonitrile).

A chain transfer agent can be appropriately used for the polymerization in the present invention so as to adjust the molecular weight. It is possible to use, as the "chain transfer agent", compounds well-known to those skilled in the art. Examples thereof include mercaptans such as n-dodecylmercaptan (nDM), laurylmethylmercaptan, mercaptoethanol and the like.

As mentioned above, the acrylic polyol is obtainable by polymerizing the polymerizable monomers. From the viewpoint of coatability (or applicability) of the adhesive, the weight average molecular weight of the acrylic polyol is preferably 200,000 or less, more preferably 5,000 to 100,000, and most preferably 10,000 to 80,000. The weight average molecular weight is a value obtained by gel permeation chromatography (GPC) in terms of polystyrene standard. Specifically, the value can be obtained using the following GPC apparatus and measuring method. HCL-8220GPC manufactured by TOSOH CORPORATION is used as a GPC apparatus, and RI is used as a detector. Two TSK gel SuperMultipore HZ-M manufactured by TOSOH CORPORATION are used as a GPC column. A sample is dissolved in tetrahydrofuran and the obtained solution is allowed to flow at a flow rate of 0.35 ml/min and a column temperature of 40° C., and then Mw is determined by conversion of the measured molecular weight based on a calibration curve which is obtained by using polystyrene having a monodisperse molecular weight as a standard reference material.

A glass transition temperature of the acrylic polyol can be set by adjusting a mass fraction of a monomer to be used. The glass transition temperature of the acrylic polyol can be determined based on a glass transition temperature of a homopolymer obtainable from each monomer and a mass fraction of the homopolymer used in the acrylic polyol using the following calculation formula (i). It is preferred to determine a composition of the monomer of the adhesive using the glass transition temperature determined by the calculation:

$$1/Tg = W1/Tg1 + W2/Tg2 + \ldots + Wn/Tgn \tag{i}$$

where in the above formula (i), Tg denotes the glass transition temperature of the acrylic polyol, each of W1, W2, ..., Wn denotes the mass fraction of each monomer, and each of Tg1, Tg2, ..., and Tgn denotes the glass transition temperature of the homopolymer corresponding to each monomer.

A value described in the document can be used as Tg of the homopolymer. It is possible to refer, as such a document, for example, the following documents: Acrylic Ester Catalog of Mitsubishi Rayon Co., Ltd. (1997 Version); edited by Kyozo Kitaoka, "Shin Kobunshi Bunko 7, Guide to Synthetic Resin for Coating Material", Kobunshi Kankokai, published in 1997, pp.168-169; and "POLYMER HANDBOOK", 3rd Edition, pp.209-277, John Wiley & Sons, Inc. published in 1989.

In the present specification, glass transition temperatures of homopolymers of the following monomers are as follows.
Methyl methacrylate: 105° C.
2-Ethylhexyl acrylate: −70° C.
n-Butyl acrylate: −54° C.
Ethyl acrylate: −20° C.
2-Hydroxyethyl methacrylate: 55° C.
2-Hydroxyethyl acrylate: −15° C.
Glycidyl methacrylate: 41° C.
Acrylonitrile: 130° C.

Styrene: 105° C.

Cyclohexyl methacrylate: 83° C.

Acrylic acid: 106° C.

In the present invention, the acrylic polyol has a glass transition temperature of from −35° C. to 20° C. Considering initial adhesion to a film, peel strength after aging and hydrolysis resistance, the acrylic polyol more preferably has a glass transition temperature of from −30° C. to 20° C., and particularly preferably has a glass transition temperature of from −25° C. to 15° C.

When the acrylic polyol has a glass transition temperature less than −35° C., the adhesive for laminated sheets has a lowered cohesive force, peel strength after aging and hydrolysis resistance may degrade. When the acrylic polyol has a glass transition temperature higher than 20° C., the adhesive for laminated sheets may be too hard, it may be difficult to use the adhesive as an adhesive for laminated sheets.

A hydroxyl value of the acrylic polyol is preferably 0.5 to 40 mgKOH/g, more preferably 1 to 30 mgKOH/g, and particularly preferably 4 to 20 mgKOH/g. The hydroxyl value of the acrylic polyol is not in the above range, an adhesive for laminated sheets cannot have sufficient properties with regard to peel strength after aging and hydrolysis resistance, and it would be difficult to use the adhesive as an adhesive for laminated sheets.

In the present description, the hydroxyl value is a number of mg of potassium hydroxide required to neutralize acetic acid combined with hydroxyl groups in case of acetylating 1 g of a resin.

In the present invention, the hydroxyl value is specifically calculated by the following formula (ii).

Hydroxyl value=(Weight of monomer having a hydroxyl group)/(Molecular weight of monomer having a hydroxyl group)×Mole number of hydroxyl groups contained in 1 mol of monomer having a hydroxyl group×Formula weight of KOH×1,000/Weight of the acrylic polyol     (ii)

In the present description, (B) at least one selected from carboxylic acids and carboxylic anhydrides means that any one of the carboxylic acids and carboxylic anhydrides may be used alone and a mixture (or combination) of the both may be used.

Since the adhesive for laminated sheets based on the present invention comprises the component (B), it is excellent in curability while maintaining suitable pot life.

The "carboxylic acid" means an organic acid having at least one carboxyl group, and the "carboxyl anhydride" means a compound having a structure (carboxylic anhydride group) in which two carboxyl groups are anhydrated and condensed.

Examples of the carboxylic acid include formic acid, acrylic acid, methacrylic acid, acetic acid, propionic acid, butyric acid, pentanoic acid, hexanoic acid, heptanoic acid, octanoic acid, nonanoic acid, decanoic acid, lauric acid, tetradecanoic acid, hexadecanoic acid, heptadecanoic acid, stearic acid, oxalic acid, malonic acid, succinic acid, glutaric acid, adipic acid, pimeric acid, suberic acid, azelaic acid, sebacic acid, fumaric acid, maleic acid, oleic acid, linoleic acid, linolenic acid, arachidonic acid, docosahexaenoic acid, eicosapentaenoic acid, sorbic acid, 2-hydroxypropanoic acid, 2-hydroxybutanoic acid, 2-hydroxypropanetricarboxylic acid, 3-hydroxyphenylacetic acid, glycolic acid, diphenolic acid, benzoic acid, 4-hydroxybenzoic acid, salicylic acid, gallic acid, cinnamic acid, phthalic acid, isophthalic acid, 2-oxopropanoic acid, dimer acid, trimer acid, 1,2,3-propanetricarboxylic acid, melitic acid, pyromelitic acid, trimelitic acid and the like.

Examples of the carboxylic anhydride include acetic anhydride, phthalic anhydride, 4-methylhexahydrophthalic anhydride, benzoic anhydride, 4,4-oxyphthalic anhydride, propionic anhydride, succinic anhydride, maleic anhydride, trimelitic anhydride, cyclohexane-1,2,4-tricarboxylic anhydride and the like.

In the present invention, (B) the at least one selected from carboxylic acids and carboxylic anhydrides more preferably comprises a compound having a melting point of 250° C. or less, most preferably comprises a compound having a melting point of 200° C. or less. When the melting point of the component (B) is in the above range, the adhesive based on the present invention has an improved curability, and the appearance of the obtainable laminated sheet would be preferable.

In the present description, the melting point refers to a value measured by differential scanning calorimetry (DSC). Specifically, after weighing 10 mg of a sample in an aluminum container, the measurement is carried out at temperature rise rate of 10° C./minute using DSC6220 (trade name) manufactured by SII NanoTechnology Inc., and the temperature of a top of a fusion peak refers to the melting point.

In the present invention, the at least one selected from carboxylic acids and carboxylic anhydrides (B) is preferably blended in an amount of 0.01 to 10 parts by weight per 100 parts by weight of the acrylic polyol (A). When the component (B) is blended in an amount of the above range, the adhesive for laminated sheets based on the present invention has an improved curability, but the pot life would not become too short, and as a result, it would be easy to apply the adhesive.

In the present invention, the component (B) is preferably blended in an amount of 0.01 to 8.0 parts by weight per 100 parts by weight of the total of the components (A)-(C). When the component (B) is blended in an amount of the above range, the adhesive for laminated sheets based on the present invention has an improved curability, but the pot life would not become too short, and as a result, it would be easy to apply the adhesive.

In the present invention, the component (B) preferably comprises at least one selected from adipic acid, benzoic acid, dimer acid, azelaic acid and trimelitic anhydride. When the component (B) preferably comprises at least one selected from adipic acid, benzoic acid, dimer acid, azelaic acid and trimelitic anhydride, the adhesive for laminated sheets based on the present invention not only has an improved curability, but also is excellent in both peel strength after aging and hydrolysis resistance.

Examples of (C) the isocyanate compound include an aliphatic isocyanate, an alicyclic isocyanate and an aromatic isocyanate, and there is no particular limitation on the isocyanate compound as long as the objective adhesive for laminated sheets based on the present invention can be obtained.

In the present specification, the "aliphatic isocyanate" refers to a compound which has a chain-like hydrocarbon chain in which isocyanate groups are directly combined to the hydrocarbon chain, and also has no cyclic hydrocarbon chain. Although the "aliphatic isocyanate" may have an aromatic ring, the aromatic ring is not directly combined with the isocyanate groups.

In the present specification, the aromatic ring is not contained in the cyclic hydrocarbon chain.

The "alicyclic isocyanate" is a compound which has a cyclic hydrocarbon chain and may have a chain-like hydrocarbon chain. The isocyanate group may be either directly combined with the cyclic hydrocarbon chain, or may be directly combined with the obtainable chain-like hydrocarbon chain. Although the "alicyclic isocyanate" may have an aromatic ring, the aromatic ring is not directly combined to the isocyanate groups.

The "aromatic isocyanate" refers to a compound which has an aromatic ring, in which isocyanate groups are directly combined with the aromatic ring. Therefore, a compound, in which isocyanate groups are not directly combined with an aromatic ring, is classified into the aliphatic isocyanate or the alicyclic isocyanate even though it contains the aromatic ring in the molecule.

Therefore, for example, 4,4'-diphenylmethane diisocyanate (OCN—$C_6H_4$—$CH_2$—$C_6H_4$—NCO) corresponds to the aromatic isocyanate, since the isocyanate groups are directly combined with the aromatic ring. On the other hand, for example, xylylene diisocyanate (OCN—CH2-C6H4-CH2-NCO) corresponds to the aliphatic isocyanate since it has an aromatic ring, but the isocyanate groups are not directly combined with the aromatic ring and combined with methylene groups. The aromatic ring may be fused with two or more benzene rings.

Examples of the aliphatic isocyanate include 1,4-diisocyanatobutane, 1,5-diisocyanatopentane, 1,6-diisocyanatohexane (hereinafter also referred to as HDI), 1,6-diisocyanato-2,2,4-trimethylhexane, 2,6-diisocyanatohexanoic acid methyl ester (lysine diisocyanate), 1,3-bis(isocyanatomethyl)benzene (xylylene diisocyanate) and the like.

Examples of the alicyclic isocyanate include 5-isocyanato-1-isocyanatomethyl-1,3,3-trimethylcyclohexane (isophorone diisocyanate), 1,3-bis(isocyanatomethyl)cyclohexane (hydrogenated xylylene diisocyanate), bis(4-isocyanatocyclohexyl)methane (hydrogenated diphenylmethane diisocyanate), 1,4-diisocyanatocyclohexane and the like.

Examples of the aromatic isocyanate include 4,4'-diphenylmethane diisocyanate, p-phenylene diisocyanate, m-phenylene diisocyanate and the like. These isocyanate compounds can be used alone, or in combination.

In the present invention, there is no particular limitation on the isocyanate compound as long as the objective adhesive for laminated sheets based on the present invention can be obtained. Considering durability, it is preferred to select from the aliphatic and alicyclic isocyanates. It is particularly preferred to select from HDI, isophorone diisocyanate, and xylylene diisocyanate.

The urethane resin based on the present invention can be obtained by reacting (A) the acrylic polyol with (C) the isocyanate compound. The reaction can be carried out by a known method. In general, the reaction can be carried out by mixing the acrylic polyol with the isocyanate compound. There is no particular limitation on the mixing method as long as the urethane resin based on the present invention can be obtained.

In the present invention, an equivalent ratio (NCO/OH) of isocyanate groups based on (C) the isocyanate to hydroxyl groups based on (A) the acrylic polyol is preferably from 0.5 to 4.5, more preferably from 1.0 to 4.0, and particularly preferably from 1.5 to 3.5. When the equivalent ratio is in the above range, the adhesive for laminated sheets is excellent in curability, peel strength after aging and hydrolysis resistance.

In the present specification, the NCO/OH equivalent ratio is calculated according to the following equation (iii):

NCO/OH ratio=Amount of isocyanate (parts by weight)×(561/Hydroxyl value of the acrylic polyol)×(NCO%/(42×100)×(100/Amount of the polyol (weight of solid content)) (iii)

The adhesive for laminated sheets based on the present invention may contain an ultraviolet absorber for the purpose of improving long-term weatherability. It is possible to use, as the ultraviolet absorber, a hydroxyphenyltriazine-based compound and other commercially available ultraviolet absorbers. The "hydroxyphenyltriazine-based compound" is a kind of triazine derivatives in which a hydroxyphenyl derivative is combined with a carbon atom of a triazine derivative, and examples thereof include TINUVIN 400, TINUVIN 405, TINUVIN 479, TINUVIN 477, TINUVIN 460 (all of which are trade names) and the like which are available from BASF Corp.

The adhesive for laminated sheets may further contain a hindered phenol-based compound. The "hindered phenol-based compound" is commonly referred to as a hindered phenol-based compound, and there is no particular limitation as long as the objective adhesive for laminated sheets based on the present invention can be obtained.

Commercially available products can be used as the hindered phenol-based compound. The hindered phenol-based compound is, for example, commercially available from BASF Corp. Examples thereof include IRGANOX1010, IRGANOX1035, IRGANOX1076, IRGANOX1135, IRGANOX1330, IRGANOX1520 (all of which are trade names) and the like. The hindered phenol-based compound is added to the adhesive as an antioxidant and may be used, for example, in combination with a phosphite-based antioxidant, a thioether-based antioxidant, an amine-based antioxidant and the like.

The adhesive for laminated sheets based on the present invention may further contain a hindered amine-based compound. The "hindered amine-based compound" is commonly referred to as a hindered amine-based compound, and there is no particular limitation as long as the objective adhesive for laminated sheets based on the present invention can be obtained.

Commercially available products can be used as the hindered amine-based compound. Examples of the hindered amine-based compound include TINUVIN 765, TINUVIN 111FDL, TINUVIN 123, TINUVIN 144, TINUVIN 152, TINUVIN 292, TINUVIN 5100 (all of which are trade names) and the like which are commercially available from BASF Corp. The hindered amine-based compound is added to the adhesive as a light stabilizer and may be used, for example, in combination with a benzotriazole-based compound, a benzoate-based compound, a benzotriazole based compound and the like.

The adhesive for laminated sheets based on the present invention can further contain the other components as long as the objective adhesive for laminated sheets can be obtained.

There is no particular limitation on timing of the addition of the "other components" to the adhesive for laminated sheets as long as the objective adhesive for laminated sheets based on the present invention can be obtained. For example, the other components may be added, together with the acrylic polyol and the isocyanate compound, in the synthesis of the urethane resin, or may be added after synthesizing the urethane resin by reacting the acrylic polyol with the isocyanate compound.

Examples of the "other components" include a catalyst, a tackifier resin, a pigment, a plasticizer, a flame retardant, a wax, a silane compound and the like.

Examples of the catalyst include metal catalysts and non-metal catalysts.

Examples of the "metal catalysts" include tin catalysts (trimethyltin laurate, trimethyltin hydroxide, stannous octoate, dibutyltin dilaurate, dibutyltin diacetate, dibutyltin maleate and the like), lead based catalysts (lead oleate, lead naphthenate, lead octenoate and the like), and other metal catalysts (naphthenic acid metal salts such as cobalt naphthenate), bismuth octoate, sodium persulfate, potassium persulfate and the like.

Examples of the "non-metal catalysts" preferably include amine-based catalysts. Examples of the "amine-based catalysts" include triethylenediamine, tetramethylethylenediamine, tetramethylhexylenediamine, diazabicycloalkenes, dialkylaminoalkylamines and the like.

Examples of the "tackifier resin" include a styrene-based resin, a terpene-based resin, an aliphatic petroleum resin, an aromatic petroleum resin, a rosin ester, an acrylic resin, a polyester resin (excluding polyesterpolyols) and the like.

Examples of the "pigment" include titanium oxide, carbon black and the like.

Examples of the "plasticizer" include dioctyl phthalate, dibutyl phthalate, diisononyl adipate, dioctyl adipate, mineral spirit and the like.

Examples of the "flame retardant" include a halogen-based flame retardant, a phosphorous-based flame retardant, an antimony-based flame retardant, metal hydroxide-based flame retardant and the like.

The "wax" is preferably a wax such as a paraffin wax and a microcrystalline wax.

It is possible to use, as the silane compound, for example, (meth)acryloxyalkyltrialkoxysilanes, (meth)acryloxyalkylalkylalkoxysilanes, vinyltrialkoxysilanes, vinylalkylalkoxysilanes, epoxysilanes, mercaptosilanes and isocyanuratesilanes. However, the silane compound is not limited to only these silane compounds.

Examples of the "(meth)acryloxyalkyltrialkoxysilanes" include 3-(meth)acryloxypropyltrimethoxysilane, 3-(meth)acryloxypropyltriethoxysilane, 4-(meth)acryloxyethyltrimethoxysilane and the like.

Examples of the "(meth)acryloxyalkylalkylalkoxysilanes" include 3-(meth)acryloxypropylmethyldimethoxysilane, 3-(meth)acryloxypropylmethyldiethoxysilane, 3-(meth)acryloxypropylethyldiethoxysilane, 3-(meth)acryloxyethylmethyldimethoxysilane and the like.

Examples of the "vinyltrialkoxysilanes" include vinyltrimethoxysilane, vinyltriethoxysilane, vinyldimethoxyethoxysilane, vinyltri(methoxyethoxy)silane, vinyltri(ethoxymethoxy)silane and the like.

Examples of the "vinylalkylalkoxysilanes" include vinylmethyldimethoxysilane, vinylethyldi(methoxyethoxy)silane, vinyldimethylmethoxysilane, vinyldiethyl(methoxyethoxy)silane and the like.

For example, the "epoxysilanes" can be classified into glycidyl-based silanes and epoxycyclohexyl-based silanes. The "glycidyl based silanes" have a glycidoxy group, and specific examples thereof include 3-glycidoxypropylmethyldiisopropenoxysilane, 3-glycidoxypropyltrimethoxysilane, 3-glycidoxypropyltriethoxysilane, 3-glycidoxypropyldiethoxysilane and the like.

The "epoxycyclohexyl based silanes" have a 3,4-epoxycyclohexyl group, and specific examples thereof include 2-(3,4-epoxycyclohexyl)ethyltrimethoxysilane, 2-(3,4-epoxycyclohexyl)ethyltriethoxysilane and the like.

Examples of the "mercaptosilanes" include 3-mercaptopropyltrimethoxysilane, 3-mercaptopropyltriethoxysilane and the like.

Examples of the "isocyanuratesilanes" include tris(3-(trimethoxysilyl)propyl)isocyanurate and the like.

The pot life of the adhesive for laminated sheets based on the present invention is evaluated by mixing the components (A) to (C) and the other additive(s), measuring viscosity of the mixture for several hours, and determining a degree (or level) of increase in viscosity of the mixture. The viscosity of the adhesive for laminated sheets is measured by using a rotational viscometer (Model BM, manufactured by TOKIMEC Inc.). If the viscosity of the adhesive rapidly increases, there may be some difficulties on the productivity of a laminated sheet.

The adhesive for laminated sheets based on the present invention can be produced by mixing the above-mentioned urethane resin and optionally added an ultraviolet absorber, an antioxidant, a light stabilizer, and/or other components. There is no particular limitation on the mixing method as long as the objective adhesive for laminated sheets based on the present invention can be obtained. There is also no particular limitation on the order of mixing the components. The adhesive for laminated sheets based on the present invention can be produced without a special mixing method and a special mixing order. The obtained adhesive for laminated sheets maintains excellent hydrolysis resistance at a high temperature for a long term, is excellent in curability, is excellent in adhesive property to a film after aging and in total balance among various properties.

Therefore, a laminated sheet is produced by laminating a plurality of adherents using the adhesive based on the present invention, and the obtained laminated sheet is used for producing various packaging bags and various outdoor materials.

The packaging bag based on the present invention means a bag like article (or material) obtained by processing the laminated sheet so as to enclose foods, detergents, shampoo, rinse and the like. Examples of the outdoor materials based on the present invention include barrier materials, roof materials, solar battery modules, window materials, outdoor flooring materials, illumination protective materials, automobile members, signboards and the like.

These packaging bags and outdoor materials comprise the laminated sheet obtainable by laminating plural films as an adherent. Examples of the films include a film (metal deposited film) in which metal is deposited on a plastic base material, and a film (plastic film) in which metal is not deposited.

It is required for an adhesive for producing a solar battery module to have initial adhesion to a film and curability in a particularly high level, and further hydrolysis resistance at a high temperature for a long term. The adhesive for laminated sheets based on the present invention is excellent in hydrolysis resistance at a high temperature for a long term, and thus the adhesive is suitable as an adhesive for solar battery back sheets.

When the laminated sheet is produced, the adhesive for laminated sheets based on the present invention is applied to a film. The application can be performed by various methods such as gravure coating, wire bar coating, air knife coating, die coating, lip coating, comma coating and the like. Plural films coated with the adhesive for laminated sheets based on the present invention are laminated each other to obtain the laminated sheet.

Figure 2:
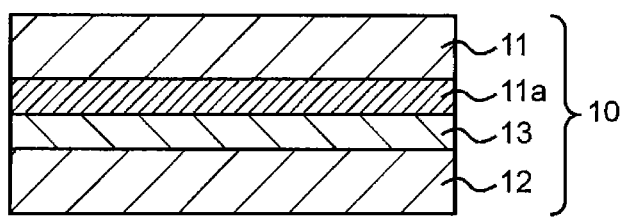
FIG. 2 is a sectional view showing another embodiment of a solar battery backsheet based on the present invention.
Figure 3:
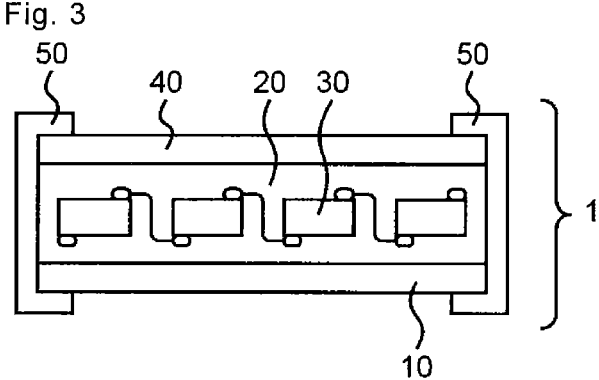
FIG. 3 is a sectional view showing an embodiment of a solar battery module based on the present invention.

Embodiments of the laminated sheet based on the present invention are shown in FIGS. 1 to 3, but the present invention is not limited to these embodiments.

FIG. 1 is a sectional view showing an embodiment of the laminated sheet based on the present invention. The laminated sheet 10 is formed of two films and an adhesive for laminated sheets 13 interposed therebetween, and the two films 11 and 12 are laminated each other using the adhesive for laminated sheets 13. The films 11 and 12 may be made of either the same or different material. In FIG. 1, the two films 11 and 12 are laminated each other, or three or more films may be laminated one another.

Another embodiment of the laminated sheet based on the present invention is shown in FIG. 2. In FIG. 2, a thin film 11a is formed between the film 11 and the adhesive for laminated sheet 13. For example, the drawing shows an embodiment in which a metal thin film 11a is formed on the surface of the film 11 when the film 11 is a plastic film. The metal thin film 11a can be formed on the surface of the plastic film 11 by vapor deposition, and the laminated sheet of FIG. 2 can be obtained by laminating the film 11 (on which surface the metal thin film 11a is formed) with the film 12 by interposing the adhesive for laminated sheet 13 therebetween.

Examples of the metal to be deposited on the plastic film include aluminum, steel, copper and the like. It is possible to impart barrier properties to the plastic film by subjecting the film to vapor deposition. Silicon oxide or aluminum oxide is used as a vapor deposition material. The plastic film 11 as a base material may be either transparent, or white- or black-colored.

A plastic film made of polyvinyl chloride, polyester, a fluorine resin or an acrylic resin is used as the film 12. In order to impart heat resistance, weatherability, rigidity, and insulating properties, a polyethylene terephthalate film or a polybutylene terephthalate film is preferably used. The films 11 and 12 may be either transparent, or may be colored.

The deposited thin film 11a of the film 11 and the film 12 are laminated each other using the adhesive for laminated sheets 13 based on the present invention, and the films 11 and 12 are often laminated each other by a dry lamination method.

FIG. 3 shows a sectional view of an example of a solar battery module as an embodiment of the present invention. In FIG. 3, it is possible to obtain a solar battery module 1 by overlaying a glass plate 40, a sealing material 20 such as an ethylene-vinyl acetate resin (EVA), plural solar battery cells 30 which are commonly connected with each other to generate a desired voltage, and a back sheet 10 one another, and then fixing these members 10, 20, 30 and 40 using a spacer 50.

As mentioned above, since the backsheet 10 is a laminate of plural films 11 and 12, it is required for the adhesive for laminated sheets 13 to cause no peeling of the films 11 and 12 even if the backsheet 10 is exposed to outdoor over a long period.

The solar battery cell 30 is often produced by using silicon, and is sometimes produced by using an organic resin containing a dye. In that case, the solar battery module 1 becomes an organic-based (dye-sensitization) solar battery module. Since colorability is required to the organic-based (dye-sensitization) solar battery, a transparent film is often used as the films 11 and 12 which constitute the solar battery backsheet 10. Therefore, it is required for the adhesive for laminated sheets 13 to cause very little change in color difference even though exposed to outdoor over a long period, and to have excellent weatherability.

In the present invention, when the sealing material 20 is combined with the backsheet 10, the adhesive for laminated sheets is not released form the film 11.

EXAMPLES

The present invention is illustrated with reference to Examples and Comparative Examples, but these examples are for explaining the present invention and do not limit the present invention at all.

Synthesis of Acrylic Polyol

Synthetic Example 1 ((A1) Acrylic polyol (Polymer 1))

In a four-necked flask equipped with a stirring blade, a thermometer and a reflux condenser tube, 100 parts by weight of ethyl acetate (manufactured by Wako Pure Chemical Industries, Ltd.) was charged and refluxed at about 80° C. In the flask, 1.0 parts by weight of 2,2-azobisisobutyronitrile was added as a polymerization initiator, and a mixture of monomers in each amount shown in Table 1 was continuously added dropwise over 1 hour and 30 minutes. After further heating for one hour, a step in which 0.2 parts by weight of 2,2-azobisisobutyronitrile was added to the mixture and then the mixture was reacted for one hour was repeated four times. A solution containing 40.0% by weight of non-volatile components (solid content) of an acrylic polyol was obtained.

The composition of the polymerizable monomer components of the acrylic polyol (polymer 1) and physical properties of the obtained polymer 1 are shown in Table 1.

Synthetic Examples 2 to 18

(A2) polymer 2 to (A'18) polymer 18 were prepared by using a similar method with that of synthetic example 1 except for adjusting the molecular weight of each of the polymers (A) by modifying the amount of 2,2-azobisisobutyronitrile to be added and except for changing the composition of the monomers and the like to be used so as to synthesize each of the acrylic polyols as presented in Tables 1 and 2. Physical properties of the obtained polymers 2 to 18 are shown in Tables 1 and 2.

The polymerizable monomers shown in Tables 1 and 2, and other components thereof are shown below.

Methyl methacrylate (MMA): produced by Wako Pure Chemical Industries, Ltd.

2-Ethylhexyl acrylate (2EHA): produced by Wako Pure Chemical Industries, Ltd.

Butyl acrylate (BA): produced by Wako Pure Chemical Industries, Ltd.

Ethyl acrylate (EA): produced by Wako Pure Chemical Industries, Ltd.

Glycidyl methacrylate (GMA): produced by Wako Pure Chemical Industries, Ltd.

Acrylonitrile (AN): produced by Wako Pure Chemical Industries, Ltd. 2-Hydroxyethyl methacrylate (HEMA): produced by Wako Pure Chemical Industries, Ltd.

2-Hydroxyethyl acrylate (HEA): produced by Wako Pure Chemical Industries, Ltd

Styrene (St): produced by Wako Pure Chemical Industries, Ltd.

Cyclohexyl methacrylate (CHMA): produced by Wako Pure Chemical Industries, Ltd.

Acrylic acid (AA): produced by Wako Pure Chemical Industries, Ltd.

TABLE 1

| | Synthetic Example | | | | | | | | |
|---|---|---|---|---|---|---|---|---|---|
| | (A1) | (A2) | (A3) | (A4) | (A5) | (A6) | (A7) | (A8) | (A9) |
| St | 3 | 0 | 8 | 3 | 2 | 2 | 3 | 0 | 0 |
| MMA | 5 | 22 | 20 | 25 | 15 | 25 | 27 | 0 | 31 |
| BA | 75 | 72.5 | 0 | 60 | 0 | 48 | 56 | 56 | 53 |
| EA | 0 | 0 | 0 | 0 | 0 | 14 | 0 | 0 | 0 |
| 2EHA | 0 | 0 | 50 | 0 | 46 | 0 | 0 | 0 | 0 |
| CHMA | 0 | 0 | 10 | 0 | 35 | 0 | 0 | 0 | 5 |
| GMA | 0 | 0 | 5 | 0 | 0 | 0 | 0 | 0 | 0 |
| AN | 15 | 5 | 5 | 10 | 0 | 10 | 12 | 40 | 8 |
| HEMA | 2 | 0.5 | 0 | 2 | 2 | 1 | 2 | 0 | 3 |
| HEA | 0 | 0 | 2 | 0 | 0 | 0 | 0 | 4 | 0 |
| AA | 0 | 0 | 0 | 0 | 0 | 0 | 0 | 0 | 0 |
| Acrylic polyol Tg (° C.) | −27 | −24 | −13 | −9 | −7 | −5 | −4 | −3 | −1 |
| Hydroxyl value (mgKOH/g) | 8.6 | 2.2 | 9.7 | 8.6 | 8.6 | 4.3 | 8.6 | 19.3 | 12.9 |
| Mw | 35000 | 102000 | 30000 | 42000 | 33000 | 52000 | 46000 | 38000 | 38000 |
| Polymer | 1 | 2 | 3 | 4 | 5 | 6 | 7 | 8 | 9 |

TABLE 2

| | Synthetic Example | | | | | | | | |
|---|---|---|---|---|---|---|---|---|---|
| | (A10) | (A11) | (A12) | (A13) | (A14) | (A'15) | (A'16) | (A'17) | (A'18) |
| St | 4 | 2 | 5 | 0 | 2 | 0 | 0 | 20 | 2 |
| MMA | 34 | 36 | 35 | 35 | 25 | 1 | 43 | 15 | 25 |
| BA | 49 | 50 | 49 | 0 | 40 | 12 | 34 | 60 | 48 |
| EA | 3 | 0 | 0 | 0 | 13 | 0 | 0 | 0 | 0 |
| 2EHA | 0 | 0 | 0 | 35 | 0 | 73 | 0 | 0 | 10 |
| CHMA | 0 | 0 | 0 | 4 | 0 | 5 | 0 | 0 | 0 |
| GMA | 3 | 0 | 0 | 0 | 0 | 0 | 0 | 0 | 0 |
| AN | 5 | 10 | 10 | 20 | 10 | 5 | 20 | 5 | 5 |
| HEMA | 2 | 1 | 1 | 0 | 2 | 4 | 3 | 0 | 10 |
| HEA | 0 | 1 | 0 | 6 | 0 | 0 | 0 | 0 | 0 |
| AA | 0 | 0 | 0 | 0 | 8 | 0 | 0 | 0 | 0 |
| Acrylic polyol Tg (° C.) | 3 | 4 | 7 | 13 | 7 | −54 | 32 | −9 | −12 |
| Hydroxyl value (mgKOH/g) | 8.6 | 9.1 | 4.3 | 29 | 8.6 | 17.2 | 12.9 | 0 | 43 |
| Mw | 36000 | 9800 | 72000 | 27000 | 45000 | 40000 | 32000 | 49000 | 39000 |
| Polymer | 10 | 11 | 12 | 13 | 14 | 15 | 16 | 17 | 18 |

Calculation of Glass Transition Temperature (Tg) of Polymers

Tgs of the polymers 1 (A1) to 18 (A'18) were calculated by the above-mentioned formula (i) using the glass transition temperatures of homopolymers of the "polymerizable monomers" as a raw material of each polymer. A document value was used as the Tg of each homopolymer of methyl methacrylate and the like.

Production of Adhesive for Laminated Sheets

Each of adhesives for laminated sheets was produced by blending a component (A) shown Tables 1 and 2 with components (B) and (C) as shown below.

(B) At least one selected from carboxylic acids and carboxylic anhydrides (B1) Acetic acid (produced by Wako Pure Chemical Industries, Ltd., melting point: −8° C.)

(B2) Hexanoic acid (produced by Wako Pure Chemical Industries, Ltd., melting point: −6° C.)

(B3) Stearic acid (produced by Wako Pure Chemical Industries, Ltd., melting point: 63° C.)

(B4) Adipic acid (produced by Wako Pure Chemical Industries, Ltd., melting point: 156° C.)

(B5) Azelaic acid (produced by Wako Pure Chemical Industries, Ltd., melting point: 104° C.)

(B6) Oleic acid (produced by Wako Pure Chemical Industries, Ltd., melting point: 2° C.)

(B7) Maleic acid (produced by Wako Pure Chemical Industries, Ltd., melting point: 143° C.)

(B8) Benzoic acid (produced by Wako Pure Chemical Industries, Ltd., melting point: 125° C.)

(B9) Isophthalic acid (produced by Wako Pure Chemical Industries, Ltd., melting point: 351° C.)

(B10) Trimelitic anhydride (produced by Wako Pure Chemical Industries, Ltd., melting point: 169° C.)

(B11) 4,4-oxydiphthalic anhydride (produced by Wako Pure Chemical Industries, Ltd., melting point: 229° C.)

(B12) Dimer acid (Pripol (trade name) produced by Croda International Plc., melting point: −47° C.)

(B'13) Methanesulfonic acid (produced by Wako Pure Chemical Industries, Ltd., melting point: 21° C.)

Using a differential scanning calorimeter (DSC) (manufactured by SII NanoTechnology Inc. under the trade name of DSC6620), the melting point of the component (B) was measured. A sample (ca. 10 mg) of each of (B) the carboxylic and carboxylic anhydride was weighed in an aluminum container, and the container was placed in the DSC apparatus and cooled to −70° C. Then, a DSC curve was measured at a rate of temperature increase of 10° C./min. A temperature of an endothermic peak top exhibited on the obtained DSC curve was referred to as the melting point.

(C) Isocyanate Compound (C1) Isocyanate compound 1 (Hexamethylene diisocyanate trimer: SUMIDULE N3300 (trade name) manufactured by Sumika Bayer Urethane Co., Ltd.: Isocyanurate)

(C2) Isocyanate compound 2 (Hexamethylene diisocyanate trimer: SUMIDULE HT (trade name) manufactured by Sumika Bayer Urethane Co., Ltd.: Adduct of trimethylolpropane)

(C3) Isocyanate compound 3 (Xylylene diisocyanate: TAKENATE 500 (trade name) manufactured by Mitsui Chemicals, Inc.)

Example 1

As shown in Table 3, 90.1 g of (A1) polymer 1 [180.2 g of an ethyl acetate solution (50.0 wt.% of solid content) of the polymer 1], 4.5 g of (B6) oleic acid, 4.05 g of (C1) isocyanate compound 1, 1.35 g of (C3) isocyanate compound 3 and 0.5 g of 3-glycidoxypropyltriethoxysilane (S1) produced by Evonik Industries AG were weighed and mixed, and then ethyl acetate was added so that the solid content was 35% to obtain an adhesive for laminated sheets.

Examples 2 to 19 and Comparative Examples 1 to 7

Each of adhesives for laminated sheets was obtained by blending the components (A) to (C) in each of the amounts shown in Tables 3 to 5 by using a method similar with that of Example 1.

TABLE 3

| Example | | 1 | 2 | 3 | 4 | 5 | 6 | 7 | 8 | 9 |
|---|---|---|---|---|---|---|---|---|---|---|
| (A) | (A1) | 90.1 | | | | | | | | |
| | (A2) | | 98.7 | | | | | | | |
| | (A3) | | | 89.6 | | | | | | |
| | (A4) | | | | 91.7 | 94.5 | | | | |
| | (A5) | | | | | | 95.3 | 95.0 | | |
| | (A6) | | | | | | | | 95.6 | |
| | (A7) | | | | | | | | | 95.6 |
| | (A8) | | | | | | | | | |
| | (A9) | | | | | | | | | |
| | (A10) | | | | | | | | | |
| | (A11) | | | | | | | | | |
| | (A12) | | | | | | | | | |
| | (A13) | | | | | | | | | |
| | (A14) | | | | | | | | | |
| (A') | (A'15) | | | | | | | | | |
| | (A'16) | | | | | | | | | |
| | (A'17) | | | | | | | | | |
| | (A'18) | | | | | | | | | |
| (B) | (B1) | | | | | | | | | |
| | (B2) | | | | 0.88 | | | | | |
| | (B3) | | 0.49 | | | | | | | |
| | (B4) | | | | | 0.28 | | | | |
| | (B5) | | | | | | | | | |
| | (B6) | 4.5 | | | | | | 0.92 | | |
| | (B7) | | | | | | | | | |
| | (B8) | | | | | | 0.19 | | | |
| | (B9) | | | | | | | | | |
| | (B10) | | | | | | | | 0.05 | |
| | (B11) | | | | | | | | | |
| | (B12) | | | 5.34 | | | | | | 0.48 |
| | (B'13) | | | | | | | | | |
| (C) | (C1) | 4.05 | | 3.31 | 2.84 | 3.5 | 3.15 | 3.42 | 3.39 | 2.87 |
| | (C2) | | | | | | | | | |
| | (C3) | 1.35 | 0.81 | 1.75 | 4.58 | 1.72 | 1.36 | 0.66 | 0.96 | 1.05 |
| (S1) | | 0.5 | 0.5 | 0.5 | 0.5 | 0.5 | 0.5 | 0.5 | 0.5 | 0.5 |
| NCO/OH | | 2.5 | 2.3 | 2.3 | 4.5 | 2.4 | 2.1 | 1.7 | 3.8 | 1.8 |
| 3. Appearance | | Normal | Normal | Good | Good | Good | Good | Good | Good | Good |
| 2. Reaction rate | | A | B | A | B | A | B | B | C | B |
| 1. Pot life | | A | A | B | A | A | A | A | A | A |
| 4. Initial Adhesion | | Good | Good | Good | Good | Good | Good | Good | Good | Good |
| 5. Peel strength after aging | | C | B | A | C | A | B | B | B | A |
| 6. Hydrolysis Resistance | | C | C | B | C | A | A | A | B | A |

TABLE 4

| Example | | 10 | 11 | 12 | 13 | 14 | 15 | 16 | 17 | 18 | 19 |
|---|---|---|---|---|---|---|---|---|---|---|---|
| (A) | (A1) | | | | | | | | | | |
| | (A2) | | | | | | | | | | |
| | (A3) | | | | | | | | | | |
| | (A4) | | | | | | | | | | |
| | (A5) | | | | | | | | | | |
| | (A6) | | | | | | | | | | |
| | (A7) | 99.0 | 94.7 | | | | | | | | |
| | (A8) | | | 92.4 | | | | | | | |
| | (A9) | | | | 92.2 | | | | | | |
| | (A10) | | | | | 94.2 | 88.7 | | | | |
| | (A11) | | | | | | | 87.8 | | | |
| | (A12) | | | | | | | | 88.5 | 96.9 | |
| | (A13) | | | | | | | | | | 88.2 |
| | (A14) | | | | | | | | | | |
| (A') | (A'15) | | | | | | | | | | |
| | (A'16) | | | | | | | | | | |
| | (A'17) | | | | | | | | | | |
| | (A'18) | | | | | | | | | | |
| (B) | (B1) | | | | | | | 7.1 | | | |
| | (B2) | | | 2.77 | | | | | | | |
| | (B3) | | | | | | | | | | |
| | (B4) | | | | | | | | | | |
| | (B5) | | | | 0.09 | 0.91 | | | | | |
| | (B6) | | | | | | | | 8.85 | | |
| | (B7) | | | | | | | | | | 0.09 |
| | (B8) | | | | | | | | | | |
| | (B9) | | | | | | | | | 0.96 | |
| | (B10) | 0.10 | 0.17 | | | | | | | | |
| | (B11) | | | | | | | 7.02 | | | |
| | (B12) | | | | | | | | | | |
| | (B'13) | | | | | | | | | | |
| (C) | (C1) | 0.9 | 3.38 | 1.13 | 5.68 | 3.2 | 3.0 | | 1.59 | 0.78 | |
| | (C2) | | | | | | | 4.65 | | | 11.71 |
| | (C3) | | 1.75 | 3.7 | 2.03 | 1.69 | 1.2 | 0.53 | 1.06 | 1.36 | |
| (S1) | | 0.5 | 0.5 | 0.5 | 0.5 | 0.5 | 0.5 | 0.5 | 0.5 | 0.5 | 0.5 |
| NCO/OH | | 0.3 | 2.5 | 1.4 | 1.2 | 2.4 | 2.1 | 1.5 | 2.9 | 2.5 | 0.8 |
| 3. Appearance | | Normal | Good | Normal | Good | Good | Good | Good | Normal | Normal | Good |
| 2. Reaction rate | | B | A | B | B | A | C | B | A | C | C |
| 1. Potlife | | A | A | A | A | A | A | C | C | A | A |
| 4. Initial Adhesion | | Good | Good | Good | Good | Good | Good | Good | Good | Normal | Normal |
| 5. Peel strength after aging | | C | A | B | A | A | B | B | B | C | B |
| 6. Hydrolysis Resistance | | C | A | C | A | B | B | C | C | C | B |

TABLE 5

| Comparative Example | | 1 | 2 | 3 | 4 | 5 | 6 | 7 |
|---|---|---|---|---|---|---|---|---|
| (A) | (A1) | | | | | | | |
| | (A2) | | | | | | 98.7 | |
| | (A3) | | | | | | | |
| | (A4) | | | | | | | |
| | (A5) | | | | | | | |
| | (A6) | | | | | | | |
| | (A7) | | | | | | | 94.7 |
| | (A8) | | | | | | | |
| | (A9) | | | | | | | |
| | (A10) | | | | | | | |
| | (A11) | | | | | | | |
| | (A12) | | | | | | | |
| | (A13) | | | | | | | |
| | (A14) | 94.8 | | | | | | |
| (A') | (A'15) | | 84.0 | | | | | |
| | (A'16) | | | 92.9 | | | | |
| | (A'17) | | | | 92.2 | | | |
| | (A'18) | | | | | 88.0 | | |
| (B) | (B1) | | | | | | | |
| | (B2) | | | | | | | |
| | (B3) | | | 0.19 | | | | |
| | (B4) | | 2.5 | | | | | |
| | (B5) | | | | | | | |
| | (B6) | | | | 2.77 | | | |
| | (B7) | | | | | | | |
| | (B8) | | | | | | | |
| | (B9) | | | | | | | |
| | (B10) | | | | | 0.18 | | |
| | (B11) | | | | | | | |
| | (B12) | | | | | | | |
| | (B'13) | | | | | | | 0.19 |
| (C) | (C1) | 3.45 | | 6.91 | 3.32 | 8.27 | 1.3 | 3.38 |
| | (C2) | | 10.5 | | | | | |
| | (C3) | 1.75 | 3 | | 1.71 | 3.55 | | 1.73 |
| (S1) | | 0.5 | 0.5 | 0.5 | 0.5 | 0.5 | 0.5 | 0.5 |
| NCO/OH | | 2.5 | 2.5 | 1.7 | — | 1.2 | 1.7 | 2.5 |
| 3. Appearance | | Bad | Bad | Good | Bad | Good | Good | Good |
| 2. Reaction rate | | A | A | A | D | A | D | C |
| 1. Pot life | | C | A | A | A | B | A | B |
| 4. Initial Adhesion | | Bad | Good | Bad | Good | Good | Good | Good |

TABLE 5-continued

| Comparative Example | 1 | 2 | 3 | 4 | 5 | 6 | 7 |
|---|---|---|---|---|---|---|---|
| 5. Peel strength after aging | B | C | B | B | D | B | C |
| 6. Hydrolysis Resistance | D | D | C | D | D | C | D |

These adhesives for laminated sheets were evaluated by the following tests.

Production of Laminated Sheet 1

Each of the adhesives for laminated sheets of Examples and Comparative Examples was applied to a transparent polyethylene terephthalate (PET) sheet (O300EW36 (trade name) manufactured by Mitsubishi Polyester Film Corporation) so that the weight of the solid content becomes 10 g/m², and then dried at 80° C. for 5 minutes. Then, a surface-treated transparent polyolefin film (linear low-density polyethylene film manufactured by Futamura Chemical Co., Ltd. under the trade name of LL-XUMN #30) was laid on the adhesive-coated surface of the PET sheet so that the treated surface contacted with the adhesive-coated surface, and then the film and the sheet were pressed using a heat (or hot) roll press machine under a pressing pressure of 0.9 MPa and 5 m/min to obtain a laminated sheet 1.

Production of Laminated Sheet 2

The adhesive for laminated sheets of Example 1 was applied to a transparent polyethylene terephthalate (PET) sheet (O300EW36 (trade name), manufactured by Mitsubishi Polyester Film Corporation) so that the weight of the solid content becomes 10 g/m2, and then dried at 80° C. for 5 minutes. Then, a surface-treated PET film (Shinebeam (trade name) manufactured by TOYOBO Co., Ltd.) was laid on the adhesive-coated surface of the PET sheet so that the treated surface contacted with the adhesive-coated surface, and then the film and the sheet were pressed using a heat roll press machine under a pressing pressure of 0.9 MPa and 5 m/min to obtain a laminated sheet 2.

Evaluation

The adhesives for laminated sheets were evaluated by the following method. The evaluation results are shown in Tables 3 to 5.

1. Evaluation of Pot Life

Each solution viscosity of the adhesives for laminated sheets was measured to evaluate pot life just after mixing the components of each adhesive and after storage of each adhesive at 25° C. for 5 and 24 hours. The each solution viscosity of Examples and Comparative Examples was measured at 25° C. and at a rotation number of 30 rpm/min, using a rotational viscometer (Model BM, manufactured by TOKIMEC Inc.).

Evaluation criteria are as follows.
A: Ratio of increase in viscosity after storage for 24 hours is less than 2.
B: Ratio of increase in viscosity after storage for 5 hours is less than 2.
C: Ratio of increase in viscosity after storage for 5 hours is 2 or more than 2.

Where the "ratio of increase in viscosity" can be calculated by the following equation (iv).

$$\text{Ratio of increase in viscosity} = \text{(Viscosity after storage for 5 or 24 hours)}/\text{(Viscosity just after mixing the components)} \quad (iv)$$

2. Evaluation of Reaction Rate (Curability)

Reaction rate of the adhesive for laminated sheets of the laminated sheet 1 was evaluated by measuring Infrared absorption (IR) just after press, and after aging at 50° C. for 70 hours and 120 hours. The IR measurement was carried out using Nicolet 380 (trade name) manufactured by Thermo Electron, a ratio of peak (2270 $cm^{-1}$ to 2250 $cm^{-1}$) height of isocyanate groups to peak (2970 $cm^{-1}$ to 2940 $cm^{-1}$) height of C-H stretching vibration of hydrocarbon groups was obtained at every aging time. The reaction rate can be calculated by the following equation (v).

$$\text{Reaction rate (\%)} = [1-(\text{Peak height of isocyanate groups after aging for 72 hours or 120 hours}/\text{Peak height of C-H stretching vibration of hydrocarbon groups after aging for 72 hours or 120 hours})/(\text{Peak height of isocyanate groups just after press}/\text{Peak height of C-H stretching vibration of hydrocarbon groups just after press})] \times 100 \quad (v)$$

Evaluation criteria are as follows.
A: Reaction rate is 95% or more after aging at 50° C. for 72 hours.
B: Reaction rate is 80% or more, and less than 95% after aging at 50° C. for 72 hours.
C: Reaction rate is less than 80% after aging at 50° C. for 72 hours, and is 80% or more after aging at 50° C. for 120 hours.
D: Reaction rate is less than 80% after aging at 50° C. for 120 hours.

3. Evaluation of Appearance of Laminated Sheet

After aging the laminated sheet 1 at 50° C. for 5 days, the surface of the laminated sheet 1 was visually observed and evaluated.

Evaluation criteria are as follows.
Good: The surface film of the laminated sheet 1 is smooth.
Normal: A wrinkle(s) by a line or foam in applying the adhesive, or a wrinkle(s) by shrink of the laminated sheet 1 is(are) seen on a part of the surface film of the laminated sheet 1.
Bad: Wrinkles by lines or foams in applying the adhesive, or wrinkles by shrink of the laminated sheet 1 are seen on most of the surface film of the laminated sheet 1.

4. Evaluation of Initial Adhesion to a Film

The laminated sheet 1 without aging was cut out into pieces of 15 mm in width to obtain a sample for evaluation. Using a tensile strength testing machine (manufactured by ORIENTEC Co., Ltd. under the trade name of TENSILON RTM-250), a 180° peel test was carried out under a room temperature environment at a testing speed of 100 mm/min.

Evaluation criteria are as follows.
Good: Peel strength is 1 N/15 mm or more
Normal: Peel strength is 0.1 N/15 mm or more and less than 1 N/15 mm
Bad: Peel strength is less than 0.1 N/15 mm 5. Measurement of Adhesive Property to a Film after Aging The laminated sheet 2 after aging at 50° C. for 120 hours was cut into pieces of 15 mm in width to obtain a sample for evaluation. Using a tensile strength testing machine (manufactured by ORIENTEC Co., Ltd. under the trade name of TENSILON RTM-250), a 180° peel test was carried out under a room temperature environment at a testing speed of 100 mm/min.

Evaluation criteria are as follows.
A: Peel strength is 12 N/15 mm or more
B: Peel strength is 9 N/15 mm or more and less than 12 N/15 mm C: Peel strength is 6 N/15 mm or more and less than 9 N/15 mm D: Peel strength is 1 N/15 mm or more and less than 6 N/15 mm 6. Evaluation of Hydrolysis Resistance Evaluation of hydrolysis resistance was carried out by an accelerated evaluation method using pressurized steam. The laminated sheet 2 after aging at 50° C. for 120 hours was cut out into pieces of 15 mm in width to obtain a sample for evaluation. The sample was left to stand under a pressurizing environment at 121° C. under 0.1 MPa for 48 hours using a high-pressure cooker (manufactured by Yamato Scientific Co., Ltd. under the trade name of Autoclave SP300), and then aged under a room temperature environment for one day. Then, the sample was cut out into pieces of 8 cm long to obtain test pieces. Hand peel test was carried out with regard to the test pieces.

The hand peel test is a test in which each test piece is peeled into a base material and an adherent (or two adherents, specifically PET sheet and PET film in this test piece) by hands of the same measurer without using a machine, and an adhesive is evaluated considering its peeled state. When adhesive property of the adhesive is satisfactorily kept, the adherent or the base material is fractured (that is, material fracture occurs) on peeling the adherent. When adhesive property of the adhesive deteriorates, the adhesive itself is fractured without causing material fracture of the adherent or the base material, or peeling occurs between the adhesive and the adherent or the base material. The peel length of the adherent and the state of material fracture were visually observed by the measurer, and hydrolysis resistance of the adhesive for laminated sheets was evaluated.

The evaluation criteria are as follows.

A: Material fracture is seen when peel length of adherent is less than 0.5 cm.

B: Material fracture is seen when peel length of adherent is 0.5 cm or more and less than 1.5 cm.

C: Material fracture is seen when peel length of adherent is 1.5 cm or more and less than 3 cm.

D: Material fracture is not seen even when peel length of adherent is 3 cm or more.

As shown in Tables 3 to 5, since the adhesives for laminated sheets of Examples 1 to 19 comprise the components (A) to (C), they are excellent in balance among the above evaluations 1 to 6, and suitable as an adhesive for laminated sheets.

On the other hand, the adhesives for laminated sheets of Comparative Examples 1 to 7 have "D" or "Bad" with regard to any one of the evaluations 1 to 6. The adhesives for laminated sheets of Comparative Examples 1, 6 and 7 comprise no component (B), and the adhesives for laminated sheets of Comparative Examples 2 to 5 comprise no component (A). It is proven that a urethane resin which does not comprise any one of the components (A) and (B) is not useful.

Particularly, Comparative Example 1 is inferior in the following three items: hydrolysis resistance, initial adhesion to a film and appearance of laminated sheets, although (A14) the acrylic polyol synthesized from acrylic acid as a polymerizable monomer was used and (A14) the component comprises a carboxyl group. Based on the results, it is confirmed that a urethane resin obtained by blending (A) an acrylic polyol, (B) at least one selected from carboxylic acids and carboxyl anhydrides, and (C) an isocyanate compound is excellent as adhesives for laminated sheets, while a carboxyl group is not introduced into (A) the acrylic polyol.

INDUSTRIAL APPLICABILITY

The present invention provides an adhesive for laminated sheets. The adhesive for laminated sheets based on the present invention maintains suitable pot life, is also excellent in reactivity and adhesive property to a film after aging. The adhesive for laminated sheets based on the present invention is suited as an adhesive for packaging bags (such as shampoo, rinses and the like) and outdoor materials (such as solar battery modules) since it is excellent in long-term hydrolysis resistance at high temperature, resulting in remarkably enhanced durability against a severe environment.

DESCRIPTION OF REFERENCE NUMERALS

1: Solar battery module, 10: Backsheet, 11: Film, 11a: Deposited thin film, 12: Film, 13: Adhesive layer, 20: Sealing material (EVA), 30: Solar battery cell, 40: Glass plate, 50: Spacer

What is claimed:

1. An adhesive for bonding films to form a laminated sheet comprising a urethane resin obtained by blending:
   (A) an acrylic polyol;
   (B) at least one carboxylic anhydride; and
   (C) an isocyanate compound,
   wherein the acrylic polyol (A) is obtained by the polymerization of a polymerizable monomer comprising (i) a monomer and (ii) an other monomer comprising 1 to 40 parts by weight of acrylonitrile based on 100 parts by weight of the polymerizable monomer,
   wherein the polymerizable monomer does not include any monomer containing a carboxyl group, and
   wherein the acrylic polyol (A) has a glass transition temperature of from −35° C. to 20° C., and has a hydroxyl value of from 0.5 to 40 mgKOH/g.

2. The adhesive according to claim 1, wherein the at least one component (B) has a melting point not more than 280° C.

3. The adhesive according to claim 1, wherein the at least one component (B) is blended in an amount of 0.01 to 8.0 parts by weight per 100 parts by weight of the total of the acrylic polyol (A); the at least one component (B); and the isocyanate compound (C).

4. The adhesive according to claim 1, wherein the monomer has a hydroxyl group and the other monomer further comprises a (meth)acrylic ester.

5. The adhesive according to claim 1, wherein acrylic polyol (A) is the reaction product of a radical polymerizable monomer having a hydroxyl group and an ethylenic double bond and acrylonitrile and a (meth)acrylic ester.

6. The adhesive according to claim 1, further comprising other components selected from catalyst, tackifier resin, pigment, plasticizer, flame retardant, wax, silane compound, ultraviolet absorber, antioxidant, light stabilizer and combinations thereof.

7. A laminated sheet comprising adjacent films bonded together by cured reaction products of the adhesive according to claim 1.

8. An article comprising a laminated sheet including adjacent films bonded together by cured reaction products of the adhesive according to claim 1.

9. The adhesive according to claim 1, wherein the (ii) other monomer comprises acrylonitrile and a (meth)acrylic ester.

10. The adhesive according to claim 1, wherein the (ii) other monomer comprises acrylonitrile, a (meth)acrylic ester and a radical polymerizable monomer having an ethylenic double bond, exceptfor acrylonitrile and (meth)acrylic ester.

11. The adhesive according to claim 1, wherein the (i) monomer is selected from 2-hydroxyethyl (meth)acrylate, 2-hydroxypropyl (meth)acrylate, 3-hydroxypropyl (meth) acrylate, 4-hydroxybutyl (meth)acrylate and combinations thereof.

12. The adhesive according to claim 1, wherein the (i) monomer comprises a hydroxyalkyl (meth)acrylate and a monomer having a hydroxyl group except for hydroxyalkyl (meth)acrylate.

\* \* \* \* \*